United States Patent
Marmo (10) Patent No.: US 11,640,032 B1
(45) Date of Patent: May 2, 2023

(54) SPLICE-ON FIBER OPTIC CONNECTOR HOLDER

(71) Applicant: John Marmo, West Islip, NY (US)

(72) Inventor: John Marmo, West Islip, NY (US)

( * ) Notice: Subject to any disclaimer, the term of this patent is extended or adjusted under 35 U.S.C. 154(b) by 0 days.

(21) Appl. No.: 17/568,811

(22) Filed: Jan. 5, 2022

(51) Int. Cl.
G02B 6/255 (2006.01)
G02B 6/36 (2006.01)

(52) U.S. Cl.
CPC ......... *G02B 6/2553* (2013.01); *G02B 6/2551* (2013.01); *G02B 6/3636* (2013.01); *G02B 6/3696* (2013.01)

(58) Field of Classification Search
CPC .................................................. G02B 6/2555
See application file for complete search history.

(56) References Cited

U.S. PATENT DOCUMENTS

| | | | |
|---|---|---|---|
| 5,067,784 A | 11/1991 | Debortoli et al. | |
| 5,167,001 A | 11/1992 | Debortoli et al. | |
| 5,353,367 A | 10/1994 | Czosnowski et al. | |
| 7,438,485 B2 | 10/2008 | Tabata et al. | |
| 8,385,711 B2 | 2/2013 | Fabrykowski et al. | |
| 8,385,713 B2 | 2/2013 | Giotto et al. | |
| 9,016,953 B2 | 4/2015 | Ott et al. | |
| 10,345,527 B2 * | 7/2019 | Yamaguchi | G02B 6/2553 |

* cited by examiner

*Primary Examiner* — Omar R Rojas
(74) *Attorney, Agent, or Firm* — Edison Law Group (57) ABSTRACT

A holder configured for use with a fiber optic cable connector body is disclosed. The holder includes, as an improvement, an integral stop. The integral stop includes a wall located adjacent a first end portion of the connector holder. The plurality of substantially semicylindrical recesses are located between the first end portion and a second end portion spaced from the first end portion. The wall is located between two adjacent recesses of the plurality of recesses. The wall includes a base oriented along a longitudinal axis. The wall has a first exterior surface, and a second exterior surface spaced from the first exterior surface. The first and second exterior surfaces each extend from the base and are oriented transverse to the longitudinal axis.

20 Claims, 11 Drawing Sheets

SPLICE-ON FIBER OPTIC CONNECTOR HOLDER

FIELD

The present subject matter is generally directed to fiber optic connector holders and is—more particularly—for an improved fiber optic connector holder.

BACKGROUND

While connector holders for optic fibers have been well known for years (see, e.g., U.S. Pat. Nos. 5,067,784 and 5,167,001, both to Debortoli et al.; U.S. Pat. No. 5,353,367 to Czosnowski et al.; U.S. Pat. No. 8.385,711 to Fabrykowskl et al.), when fusion splicers came into usage, the size and shape of optic fiber connector holders changed to present configurations. See, e.g., U.S. Pat. No. 7,438,485 to Tabata et al.

Fiber optic communication systems (many of which are serviced by skilled technicians employing fusion spicing machines) are becoming prevalent, in part, because current service providers want to deliver high bandwidth communication capabilities (e.g., data and voice) to customers. Fiber optic communication systems employ a network of fiber optic cables to transmit large volumes of data, including textual and voice signals, over ever increasing relatively long distances. Optical fiber connectors are thus important to fiber optic communication systems. Fiber optic connectors enable two optical fibers to be optically connected and disconnected.

A typical fiber optic connector includes a furrule assembly supported at a front end of a typical connector housing. The ferrule assembly includes a ferrule and a hub mounted to a rear or back end of the ferrule. A spring is used to bias the furrule assembly in a forward direction relative to the connector housing. The ferrule serves to support an end portion of at least one optical fiber (such as where, in the case of a multi-fiber ferrule, the ends of multiple fibers are supported). The ferrule has a front end face, at which a polished end of the optical fiber is located.

When two fiber optic connectors are interconnected, the front end faces of the respective ferrules face and contact ("abut") one another and the ferrules are forced together by the spring loads of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of a fiber optic adapter that receives the connectors, also aligns the ferrules, and finally mechanically holds the connectors, so that each one is "held" relative to the other.

A fiber optic connector is often secured to an end of a corresponding fiber optic cable by anchoring a tensile strength structure (e.g., strength members such as aramid yarns, fiberglass reinforced rods, etc.) of the cable to a connector housing of the connector. Connector anchoring is typically accomplished using conventional techniques, which include using adhesive or "crimps" means. The anchoring of a tensile strength structure of the cable to the connector housing is advantageous because this allows the tensile loads otherwise applied to a cable to be transferred away from the cable strength members directly to the connector housing. Thus, tensile loads are not transferred to a ferrule assembly of the fiber optic connector.

If the tensile load were to be applied to rule assembly, such tensile load could cause the ferrule assembly to be polled a direction that is against a bias of the connector spring, which may cause an optical cable (or fiber) disconnection between a connector and its corresponding mated connector. In other connector styles, a tensile strength layer of the fiber optic cable can be anchored to a hub of the ferrule assembly. Those of ordinary skill in this field may refer to these sorts of connectors, as described above, as "pull-proof" connectors.

Such connectors are often installed on fiber optic cables in the factory through a so-called "direct termination" process, In a direct termination process, a connector is installed on a fiber optic cable by securing an end portion of an optical fiber of a fiber optic cable within a ferrule of a connector. After the end portion of the optical fiber has been secured within a ferrule, an end face of the ferrule and an end face of the optical fiber are polished and then generally "processed" to provide an acceptable optical interface at ends of the optical fibers. Splice-on fiber optic connectors are well known. A splice-on fiber optic connector often includes a ferrule assembly having a ferrule that supports a so-called "stub" optical fiber. The stub optical fiber includes a rear stub portion that can be spliced to a corresponding optical fiber of typical fiber optic cable. See, e.g., U.S. Pat. No. 9,016,953 to Ott et al.

Fusion splicing, stated simply, is the melting of two optical fibers and joining them, end-to-end, to create a continuous length of glass fiber. A typical splice-on connector allows greater flexibility for installers, with a lower insertion loss at the point of junction between the existing fiber from the drop cable and the connector. Fusion splicing, when done using a fusion splicer machine, can be done in the field or on-site. As those of ordinary skill in this field know, several different styles and shapes of fusion spliced connectors are commonly used including, SC, ST, FC, LC and others In each case, a connector holder is employed to keep the body of the connector in a precise position within an associated fusion splicer machine so that corresponding fiber ends are precisely aligned for a fusion splice. Current practice, for each type of connector, requires a different machine and a different holder. This causes the process of matching a connector to a holders to be time consuming for an installer and may even require the installer have several fusion splicers available.

One solution to this problem is of course, to provide a so-called "universal" holder that fits into various fusion splicer machines and which also accommodates various types or styles of connector bodies. One solution to this problem, proposed in U.S. Pat. No. 8,385,713 to Giotto et al., left a much more difficult problem unsolved.

The unsolved problem which I discovered, simply stated, is this: How does one of ordinary skill in this field securely hold an optic fiber cable connector in a holder? A solution to this problem, my invention, is an improved connector holder.

Before proceeding, I shall briefly note certain terminology used in this field.

The term "FC" shall be understood to refer to an optic fiber cable connector using a threaded plug and socket. For bi-directional transmission, two optic fiber cables and two FC connectors are used. The term "SC," an acronym for a standard connector and/or a subscriber connector shall be understood to refer to an optic fiber cable connector using a push-pull latching mechanism resembling common audio and video cables. For bi-directional transmission, two optic fiber cables and two SC connectors (aka dual SC) are used. The term "LC," an acronym for Lucent connector, shall be understood to refer miniature version of an optic fiber SC connector. While an LC connector resembles an SC connector, with an LC connector being half the size, an LC connector thus has a 1.25 mm ferrule instead of a 2.5 mm ferrule. The term "ST," also referred to as a straight tip connector, the original de facto "standard" connector for commercial optic fiber cable wiring needs, shall be understood to refer to an optic fiber cable connector having a bayonet plug and a socket. Bi-directional transmission requires two fiber cables and two ST connectors.

The term "MPO" refers to an industry acronym for a "multi-fiber push on" connector, used by technicians and persons of ordinary skill in this field. The MPO connector was developed to provide multi-fiber connectivity in a single connector to support high bandwidth and high data density applications. While present fiber counts for MPO connectors are 12 and 24 optic fibers per connector, fusion splicers presently commercially available can only splice 12-fiber count MPO connectors.

The term "MTP," also used by technicians and persons of ordinary skill in this field, shall be understood to refer to an assortment of high-performance MPO connectors with special enhancements engineered to provide MTP connectors with optical and/or mechanical performance improvements in comparison to ordinary MPO connectors. In 1996, "MTP" a federally-registered trademark owned by U.S. Conec and used in relation to a family of advanced MPO connectors designed for 4-, 8-, and 12-fiber ribbon applications, was released to the U.S. market. In that same year, the International Electrotechnical Commission standardized this MPO format.

As a result, there are five types of optic fiber connectors: FC (single fiber); LC (single fiber); SC (single fiber); ST (single fiber), and MPO/MTP (12 or more fibers)

While I originally designed my improved holder as a splice-on connector holder for 900 µm optical fiber, one of ordinary skill in this field will appreciate that my improved fiber optic cable connector holder has a much broader scope of utility. For instance, my improved cable connector holder enables connectors to easily splice cable when using substantially all fusion splicers bearing such brand names as, e.g., AFL, Fiberfox, Fitel, INNO, Sumitomo, and UCL Swift (aka ILSINTECH).

Those of ordinary skill this field will appreciate learning that my improved holder, when used with LC, SC, ST, and FC style connectors, can be used with substantially all fusion splicers noted. For example, after a connector fiber stub has been stripped, cleaned, and cleaved (collectively referred to as "processed"), a connector body (to which a processed connector has been secured), can simply be dropped into an appropriate connector holder already fitted onto, e.g., one of the above noted fusion splicers. Since my improved holder design uses a gravity-assist feature to "retain" a connector securely in its proper position, my improved holder thus eliminates any need of a user to perform an otherwise extra step, to secure a connector to a holder. Otherwise extra steps may require that certain structure, e.g., a hinged planar member—occasionally referred to as a "flap," or "panel," or a "cover" by one of ordinary skill in this field—be used in conventional connector holder styles, to securely retain an optical fiber connector to its associated holder.

Improved holders, the present subject matter, enable using a conventional fusion splicer to, e.g., perform a so-called "2.2N mechanical pull test" without an optic fiber cable connector becoming loose from a holder or perhaps "popping outs" and breaking, problems often experienced with conventional connector holders.

SUMMARY

The present subject matter is directed to a holder sized and configured for use with a fiber optic cable connector body. Such connector holders are adapted, dimensioned, and configured for use in a modern day fusion splicer machine. Before summarizing my improvement, I want to describe a connector holder. The holder comprises a structural component or member that defines a longitudinal axis. Formed within the structural component or member is a hollow region oriented along the longitudinal axis. The hollow region is characterized as two pluralities of substantially semicylindrical recesses and substantially semicylindrical ridges. Individual recesses and ridges, when rearranged, provide an assortment of shapes and configurations for receiving a variety of different connector body styles.

The fiber optic cable connector holder includes—as an improvement—an integral stop. The structural component or member of holder of the present subject matter incorporates the integral stop—my improved design—into such holders. The structural component or member includes a first end portion from which a predetermined length of an end portion of fiber optic cable extends for enabling two fiber optic cable facing ends to be fused together by operation of the fusion splicer machine. The structural component or member of the holder of the present subject matter also defines a second end portion that is located opposite the first end portion of the holder. The structural component or member further includes an upper surface extending between the first and second end portions. The integral stop extends from the upper surface and is located adjacent the first end portion.

The integral stop includes a wall located adjacent the first end portion. The plurality of substantially semicylindrical recesses are located between the first and second end portions of the structural component or member. The wall is located between two adjacent recesses of the plurality of recesses. The wall includes a base oriented along the longitudinal axis, a first exterior surface, and a second exterior surface spaced from the first exterior surface. The first and second exterior surfaces each extend from the base and are oriented transverse to the longitudinal axis.

BRIEF DESCRIPTION OF THE DRAWING FIGURES

Throughout the drawing figures and detailed description, I shall use similar reference numerals to refer to similar components of the present subject matter.

DETAILED DESCRIPTION

Figure 6:
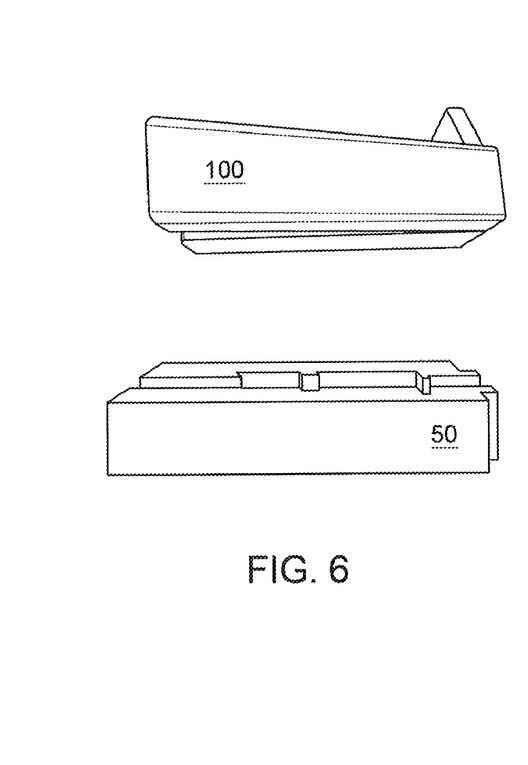
FIG. 6 presents a prior art holder and a holder of the present subject matter.

Please refer to FIG. 6 which presents side elevational views of a prior art holder 50 and an embodiment of an improved holder 100 of the present invention. Please note that I have encircled in red ink the improved portion of the holder 100.

Figure 7:
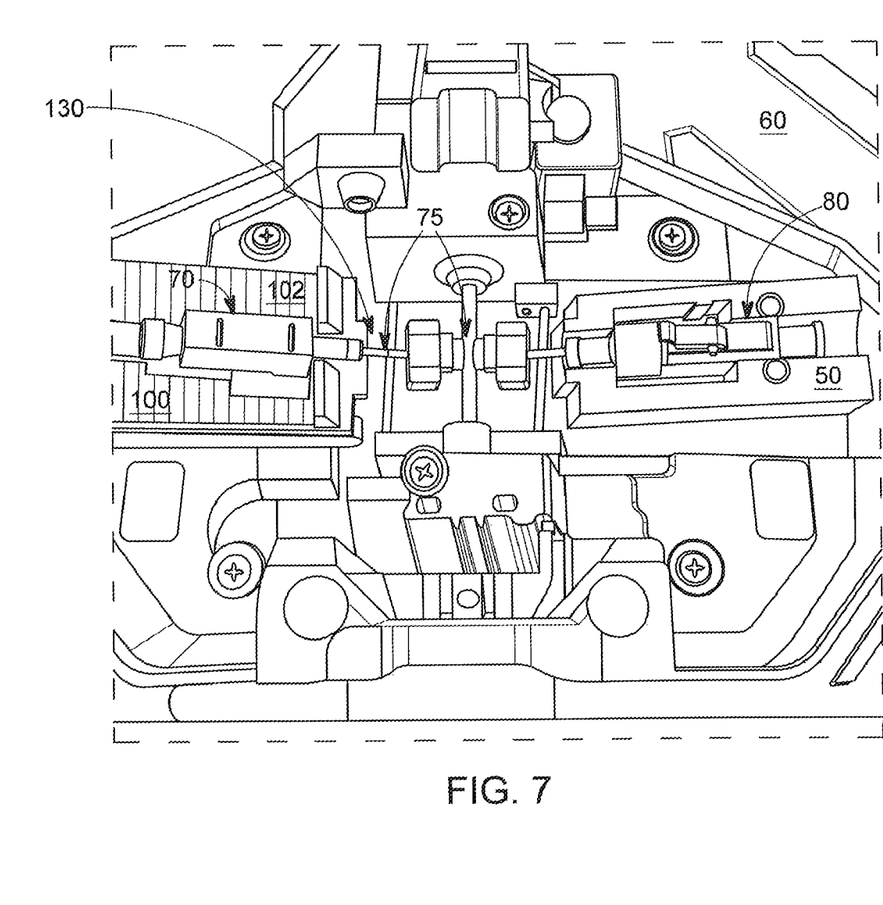
FIG. 7 presents an improved optic fiber cable connector holder of the present subject matter and a prior art connector holder, in a fusion splicer machine.

Please next refer to FIG. 7, an operational view of a conventional fusion splicer machine 60, showing one fiber optic cable connector 70 set it the improved holder 100 and another fiber optic cable connector 80 set in the prior art holder 50.

To enable those of ordinary skill in this field to understand the full scope of the present subject matter, several embodiments shall now be described in detail.

A first embodiment of the present subject matter shall now be described in connection with FIGS. 1A, 1B, 1C, 1D, 1E, and 1F. Another embodiment of the holder 100a of the present subject matter, configured to retain a fiber optic cable connector 70 (FIG. 7) and adapted for use in a fusion splicer machine 60, comprises a block of material 102a defining a longitudinal axis Xa-Xa (FIG. 1C) and a cutout 104a formed within the block of material 102a. The cutout 104a is oriented along the longitudinal axis Xa-Xa (FIG. 1C). Also, the cutout 104a defines a plurality of substantially semicylindrical recesses 106a, 108a, 110a, 112a, 114a (FIGS. 1B, 1C).

Figure 1A:
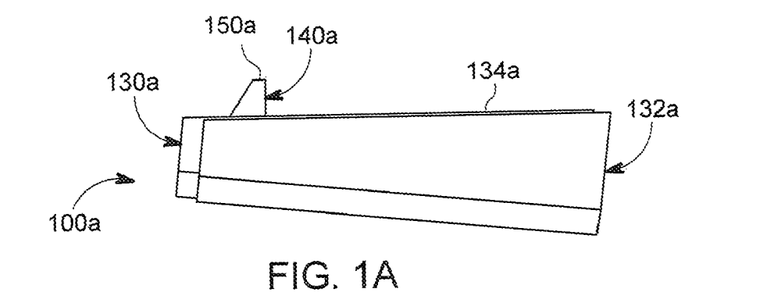
FIG. 1A is a sid elevational view of a first embodiment of an improved optic fiber cable connector holder, in accordance with the present subject matter.
Figure 1B:
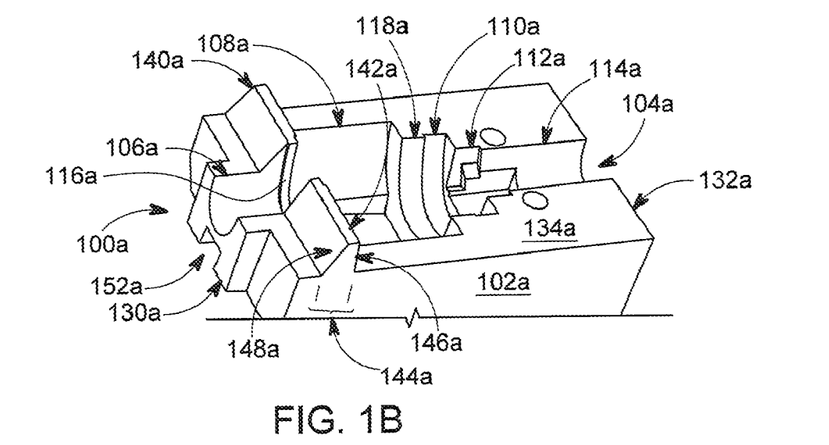
FIG. 1B is an is isometric view from a left-hand corner portion of the side view of Fig. 1A, showing an upper surface of a holder of the present subject matter.
Figure 1C:
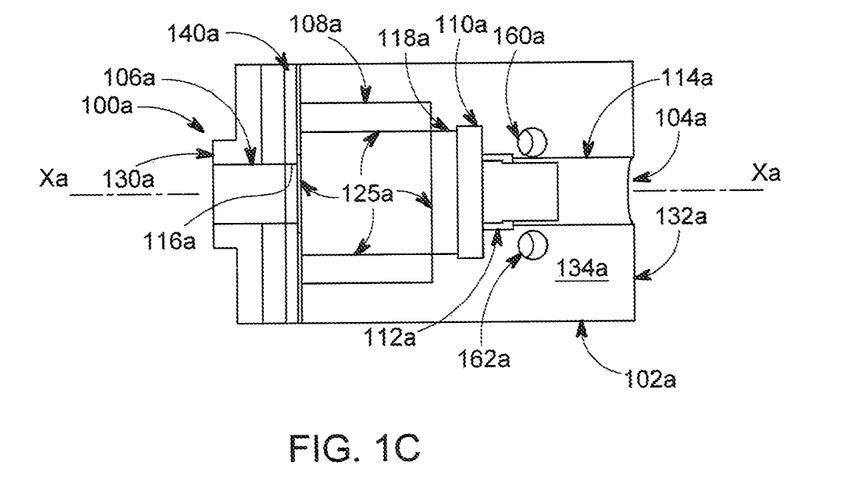
FIG. 1C is a plan view, looking down improved holder of FIG. 1A.
Figure 1D:
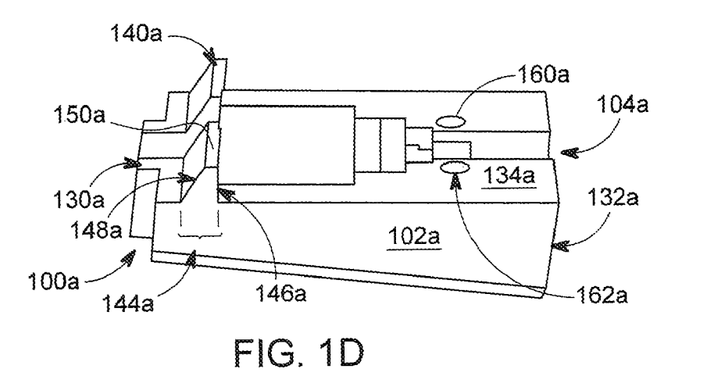
FIG. 1D is an view of the upper surface of the holder of FIG. 1A.
Figure 1E:
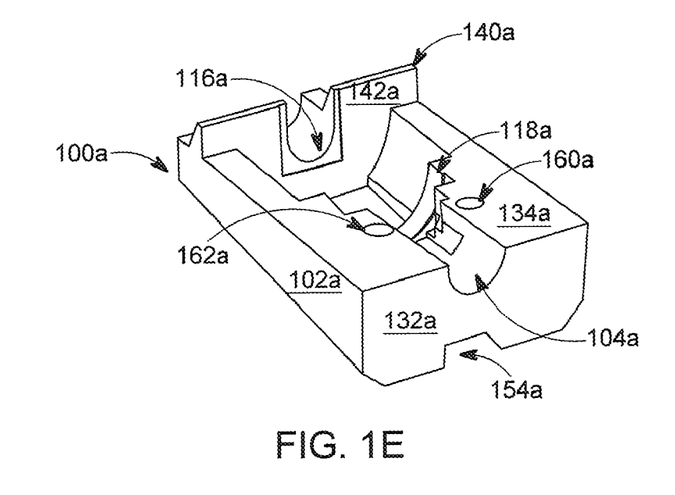
FIG. 1E is an isometric view from a right-hand corner portion of the side view of FIG. 1A, showing an upper surface of a holder of the present subject matter.
Figure 1F:
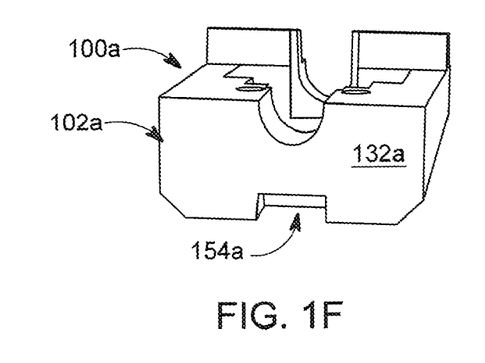
FIG. 1F is an isometric view, depicting a back side of the Fig. 1A embodiment.

The cutout 104a also defines a number of substantially semicylindrical or partially semicylindrical ridges (also referred to as shoulders or "lands" by those of ordinary skill) 116a, 118a (FIGS. 1B, 1C, and 1E). Please note that this embodiment of the improved holder 100a, is wedge shaped when viewed from a side (FIG. 1A) and includes a square hole 125a though the block of material 102a. (See FIG. 1C.)

Embodiments of the present subject matter will show that the plurality of recesses and ridges of each such embodiment are dimensioned and configured to receive a number of different conventional fiber optic cable connector body styles.

My improvement is characterized as an integral stop or abutment, formed within the block of material a manner such that the integral stop or abutment employs gravity to securely retain an optic fiber cable connector body to the holder.

The block of material 102a includes a first end portion 130a (FIG. 1C) from which a predetermined length of fiber optic cable 75 extends for enabling facing ends of two fiber optic cables to be fused together by operation of the fusion splicer machine 60 (see, e.g., FIG. 7). The block of material 102a also includes a second end portion 132a that is located opposite the first end portion 130a, and an upper surface 134a that is located between the first and second end portions 130a, 132a.

The stop or abutment 140a (FIGS. 1A, 1B, 1C) extends from the upper surface 134a of the block of material 102a and is located adjacent its first end portion 130a.

The integral stop or abutment 140a includes a wall 142a (FIGS. 1B and 1E) that is located adjacent the first end portion 130a of the block of material 102a. In addition, the wall 142a is located between two adjacent recesses 106a and 108a.

The wall 142a defines a base 144a (FIGS. 1B, 1D) oriented along longitudinal axis Xa-Xa (FIG. 1C), a first exterior surface 146a, and a second exterior surface 148a spaced from the first exterior surface 146a (FIGS. 1B, 1D). The first and second exterior surfaces 146a, 148a each extend from the base 144a. And each surface 148a, 148a is oriented transverse to the axis Xa-Xa. The wall 142a includes an upper portion or surface 150a (FIGS. 1B, 1D) spaced from the base 144a. The base 144a and the upper portion or surface 150a of wall 142a have respective lengths oriented along the longitudinal axis Xa-Xa, with the base length being the greater.

The block of material 102a of improved holder 100a of the present subject matter, in embodiments includes at least one, and in other embodiments includes a spaced-apart pair of locating cutouts 152a (see FIGS. 1B) and 154a (see FIGS. 1E, 1F) formed within an underside surface of the block of material 102a of holder 100a. Such locating cutouts 152a, 154a are dimensioned and configured for providing an interference fit with a surface configuration present on a fusion splicer machine.

The illustrated block of material 102a of this embodiment of the improved holder 100a of the present subject matter includes two locator pin apertures 160a, 162a (FIGS. 1D, 1E) located on opposite sides of longitudinal axis Xa-Xa (FIG. 1C).

A second embodiment of the present subject matter shall now be described in connection with FIGS. 2A, 2B, 2C, 2D, 2E, 2F. This embodiment of the holder 100b of the present subject matter, adapted to retain a fiber optic cable connector 70 (FIG. 7) for use in a fusion splicer machine 60, comprises a block of material 102b defining a longitudinal axis Xb-Xb (FIG. 2C) and a cutout 104b formed within the block of material 102b. Cutout 104b, oriented along axis Xb-Xb, defines several substantially semicylindrical recesses 106b, 108b, 110b, 112b, 114b (FIGS. 2B, 2C), The cutout 104b also defines a number of substantially semicylindrical or partially semicylindrical ridges 116b, 118b (FIGS. 2B, 2C, 2E). This embodiment of the improved holder 100b, is rectangular shaped when viewed from a side (FIG. 2A) and includes a square hole 125b though the block of material 102b. (See FIG. 2C.)

The block of material 102b includes a first end portion 130b (FIG. 2C) from which a predetermined length of fiber optic cable 75 extends for enabling facing ends of two fiber optic cables to be fused together by operation of the fusion splicer machine 60 (see, e.g., FIG. 7). The block of material 102b also includes a second end portion 132b that is located opposite the first end portion 130b, and an upper surface 134b that is located between the first and second end portions 130b, 132b.

A stop or abutment 140b (FIGS. 2A, 2B, 2C) extends from the upper surface 134b of the block of material 102b and is located adjacent its first end portion 130b.

The integral stop or abutment 140b includes a wall 142b (FIGS. 2A, 2E) that is located near the first end portion 130b of the block of material 102b. In addition, the wall 142b is located between two adjacent recesses 106b and 108b (FIG. 2B).

Figure 2A:
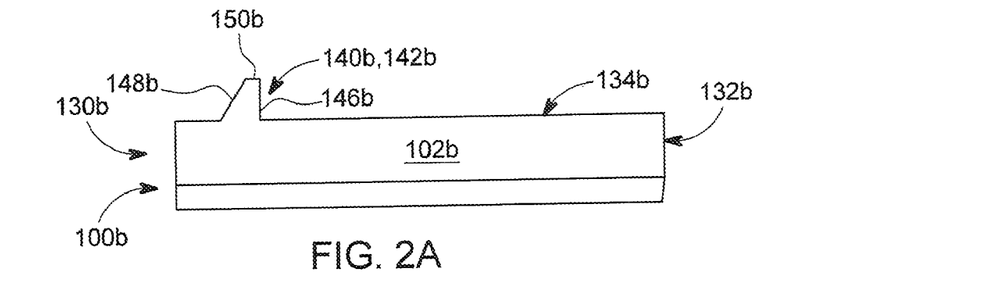
FIGS. 2A, 2B, 2C, 2D, 2E, and 2F are views of a second embodiment of an optic fiber cable connector holder, in accordance with the present subject matter, depicting views similar to what is described above for FIGS. 1A, 1B, 1C, 1D, 1E, 1F.
Figure 2B:
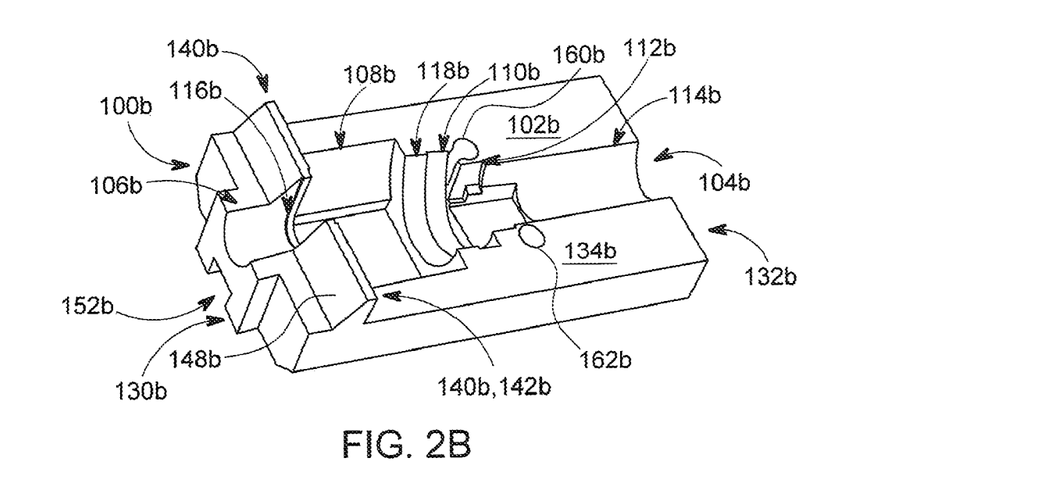
Figure 2C:
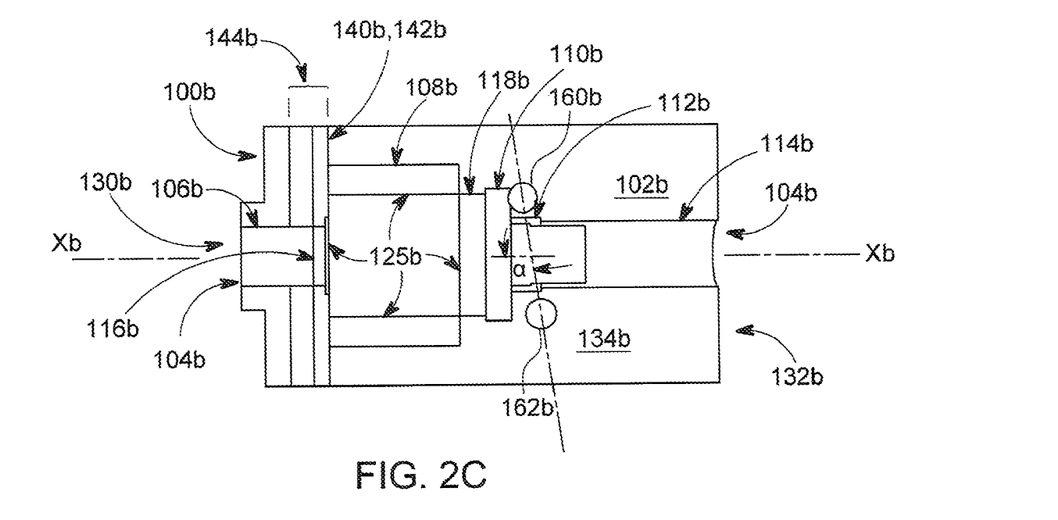
Figure 2D:
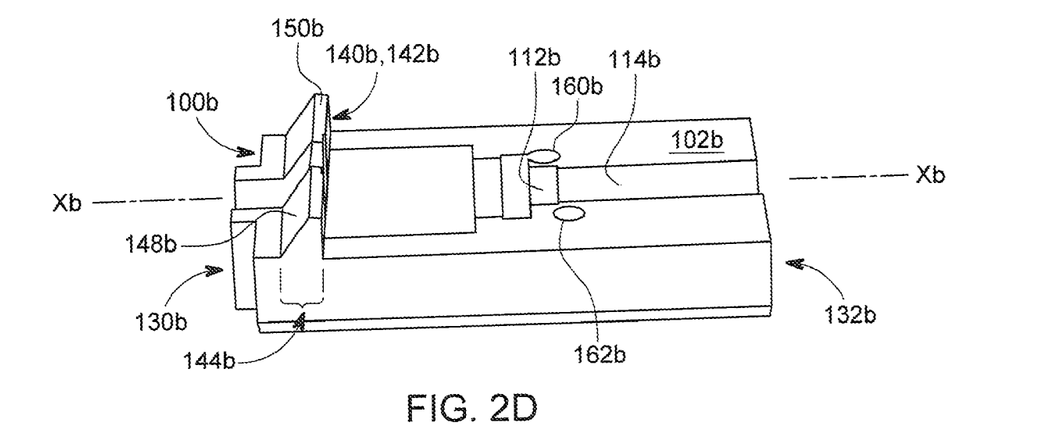
Figure 2E:
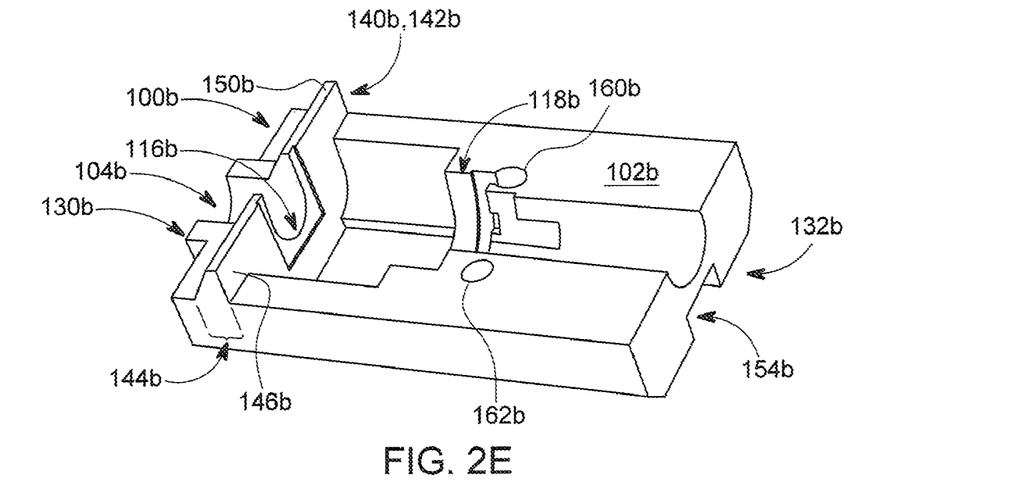
Figure 2F:
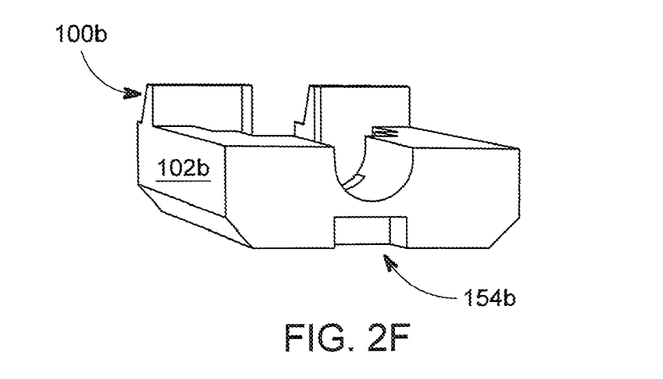

The wall 142b defines base 144b (FIGS. 2D, 2E) oriented along longitudinal axis Xb-Xb (FIG. 2D), a first exterior surface 146b (FIG. 2E) and a second exterior surface 148b (FIG. 2B) spaced from the first surface 146b (FIG. 2A). The first and second exterior surfaces 146b, 148b extend from the base 144b and are oriented transverse to axis Xb-Xb. Wall 142b includes an upper surface 150b (FIGS. 2B, 2D) spaced from the base 144b. Base 144b and upper surface 150b of wall 142b each have lengths oriented along axis Xb-Xb, with the base length being the greater.

The block of material 102b of improved bolder 100b of the present subject matter, in embodiments includes at least one, and in other embodiments includes a spaced-apart pair of locating cutouts 152b (see FIG. 2B) and 154b (FIGS. 2E, 2F) formed within an underside surface of the block of material 102b of holder 100b. Such locating cutouts 152b, 154b are dimensioned and configured for providing an interference fit with surface configurations present on a fusion splicer machine.

The block of material 102b of this embodiment of holder 100b of the present subject matter includes two locator pin apertures 160b, 162b (FIGS. 2D, 2E) located on opposite sides of longitudinal Xb-Xb (FIG. 2C) with the centers of the apertures 160b, 162b being on a Line oriented α degrees relative to axis Xb-Xb.

Figure 3A:
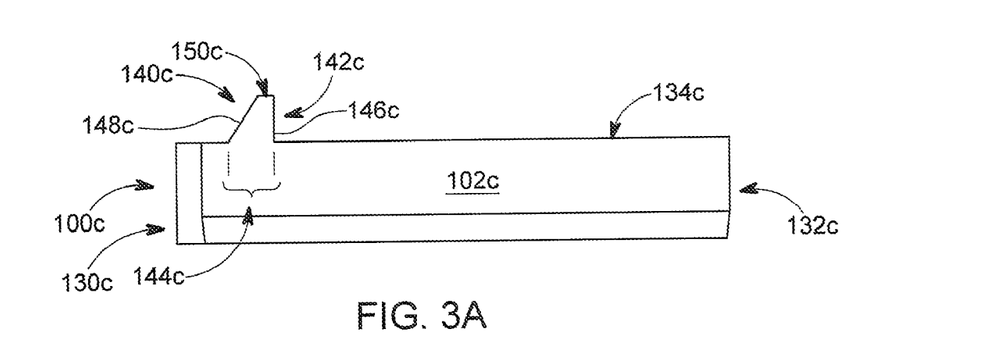
FIGS. 3A, 3B, 3C, 3D, 3E, and 3F are views of a third embodiment of an optic fiber cable connector holder, in accordance with the present subject matter, depicting views similar to what is described above for FIGS. 1A 1B, 1C, 1D, 1E, 1F.

A third embodiment of the present subject matter shall now be described in connection with FIGS. 3A, 3B, 3C, 3D, 3E, 3F. This embodiment of the holder 100c, configured to retain a fiber optic cable connector 70 (FIG. 7) for use in a fusion splicer machine 60, comprises a block of material 102c defining a longitudinal axis Xc-Xc (FIG. 3C), and a cutout 104c oriented along the axis Xc-Xc, defining several substantially semicylindrical recesses 106c, 408c, 110c, 112c, 114c (FIGS. 3B, 3C).

Figure 3B:
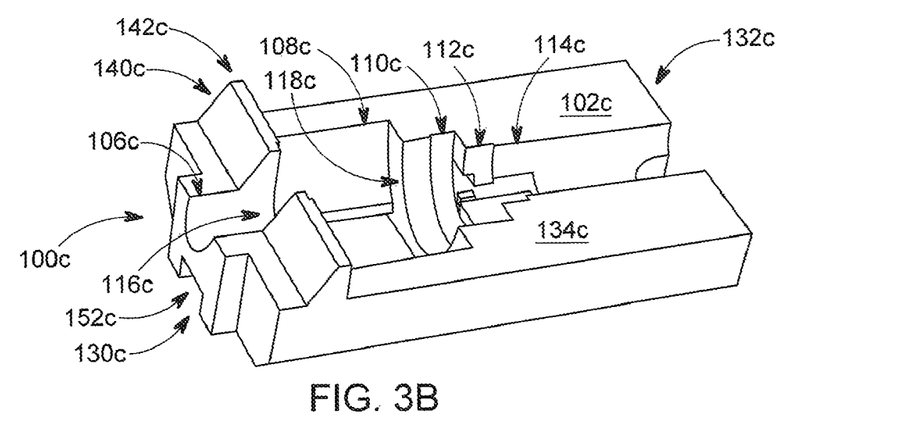
Figure 3C:
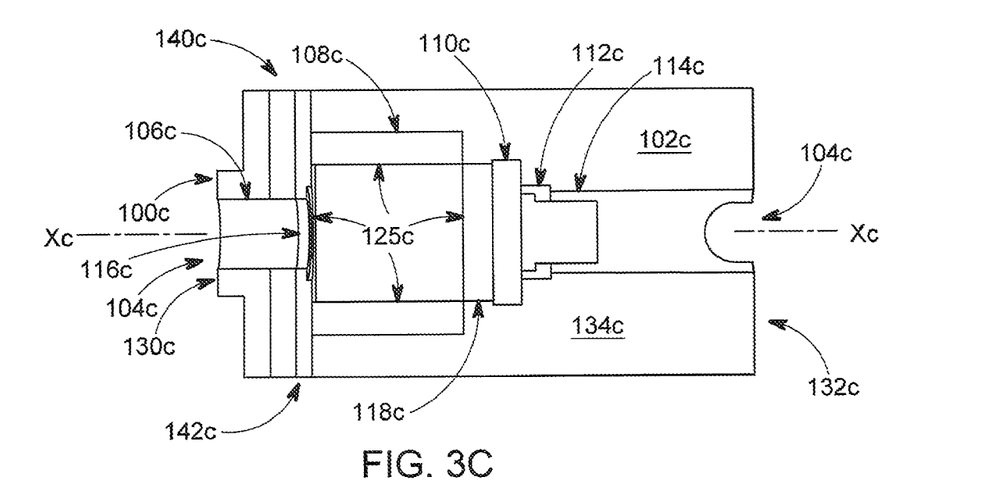
Figure 3D:
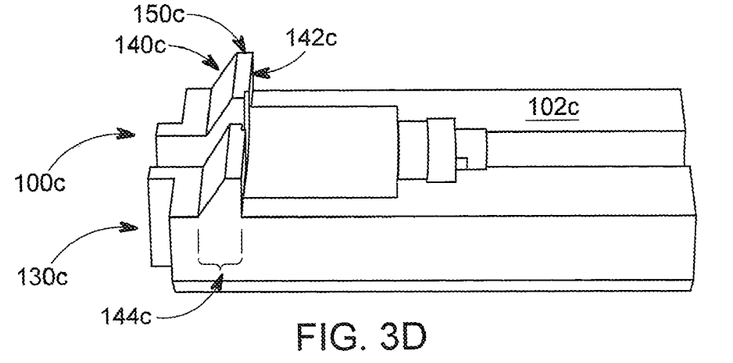
Figure 3E:
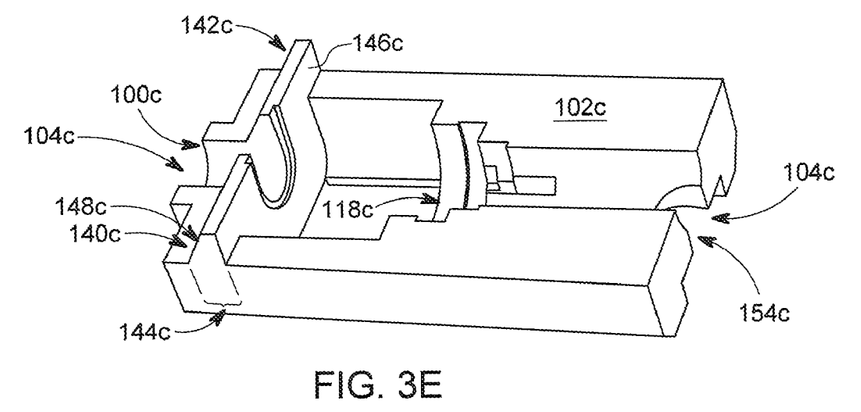
Figure 3F:
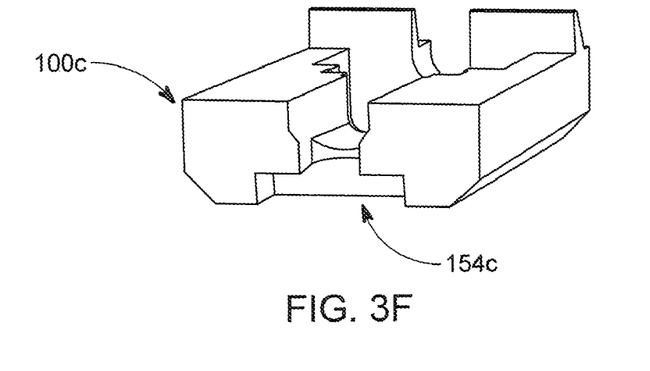

The cutout 104c also defines a number of substantially semicylindrical or partially semicylindrical ridges 116c, 118c (FIGS. 3B, 3E). This embodiment of the improved holder 100c, is rectangular shaped when viewed from a side (FIG. 3A) and includes a square hole 125c though the block of material 102c. (See FIG. 3C.)

The block of material 102c includes a first end portion 130c (FIG. 3C) from which a predetermined length of fiber optic cable 75 extends for enabling facing ends of two fiber optic cables to be fused together by operation of the fusion splicer machine 60 (see, e.g., FIG. 7). The block of material 102c includes a second end portion 132c that is located opposite the first end portion 130c, and an upper surface 134c that is located between the first and second end portions 130c, 132c.

A stop or abutment 140c (FIGS. 3A, 3B, 3C) extends from the upper surface 134c of the block of material 102c and is located adjacent its first end portion 130c.

The integral stop or abutment 140c includes a wall 142c (FIGS. 3A and 3E) that is located adjacent the first end portion 130c of the block of material 102c. In addition, the wall 142c is located between two adjacent recesses 106c and 108c.

The wall 142c defines a base 144c (FIGS. 3D, 3E) oriented along longitudinal axis Xc-Xc (FIG. 3C), a first exterior surface 146c, and a second exterior surface 148c spaced from the first exterior surface 146c (FIGS. 3A, 3E). The first and second exterior surfaces 146c, 148c each extend from the base 144c. And each exterior surface 146c, 148c is oriented transverse to the axis Xc-Xc. The wall 142c includes an upper portion or surface 150c (FIGS. 3A, 3D) spaced from the base 144c. The base 144c and the upper portion or surface 150c of wall 142c have respective lengths oriented along the longitudinal axis Xc-Xc, with the base length being the greater.

The block of material 102c of improved holder 100c of the present subject matter, in embodiments includes at least one, and in other embodiments includes a spaced-apart pair of locating cutouts 152c (see FIG. 3B) and 154c (see FIGS. 3E, 3F) formed within an underside surface of the block of material 102c of holder 100c. Such locating cutouts 152c, 154c are dimensioned and configured for providing an interference fit with a surface configuration present on a fusion splicer machine.

Figure 4A:
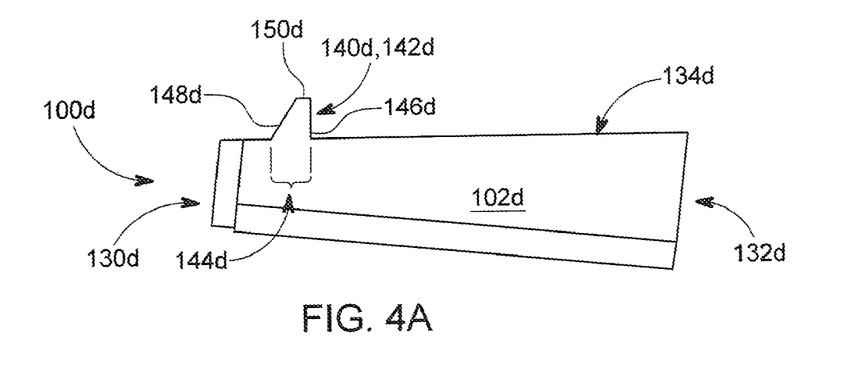
FIGS. 4A, 4B, 4C, 4D, 4E, and 4F are views of a fourth embodiment of an optic fiber cable connector holder, in accordance with the present subject matter, depicting views similar to what is described above for FIGS. 1A, 1B, 1C, 1D, 1E, 1F.

A fourth embodiment of the present subject matter shall now be described in connection with FIGS. 4A, 4B 4C, 4D, 4E, and 4F. This embodiment of the holder 100d of the present subject matter, configured to retain a fiber optic cable connector 70 (FIG. 7) and adapted for use in a fusion splicer machine 60, comprises a block of material 102d defining a longitudinal axis Xd-Xd (FIG. 4C) and a cutout 104d formed within the block of material 103d. The cutout 104d is oriented along the longitudinal axis Xd-Xd (FIG. 4C), Also, the cutout 104d defines a plurality of substantially semicylindrical recesses 106d, 108d, 110d, 114d (FIGS. 4B, 4C).

Figure 4B:
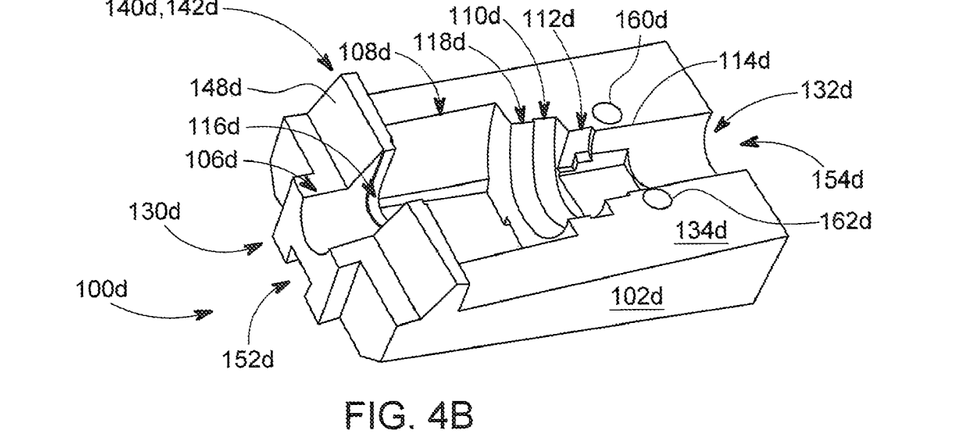
Figure 4C:
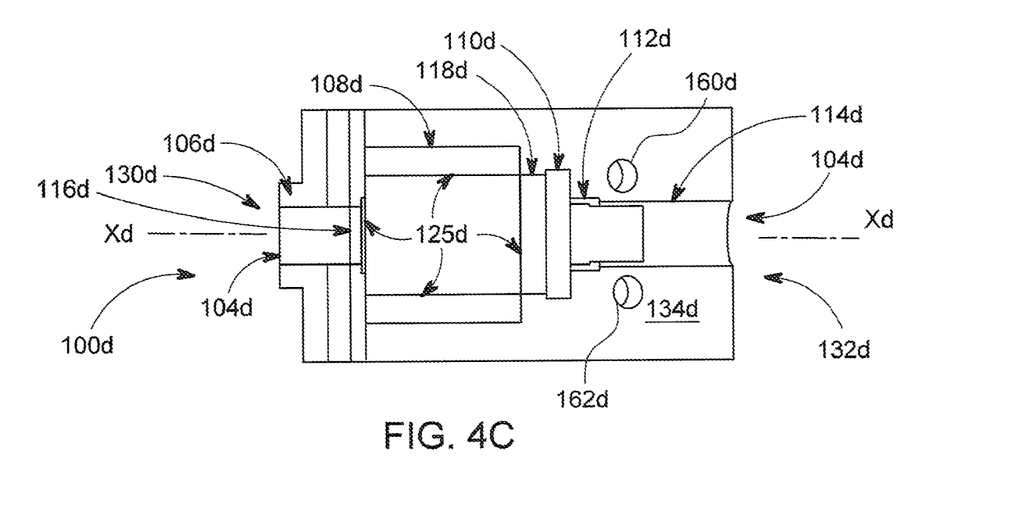
Figure 4D:
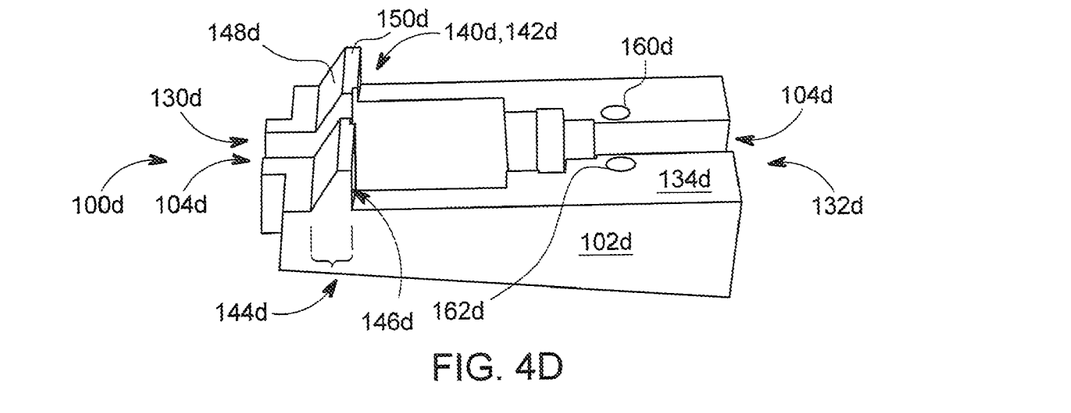
Figure 4E:
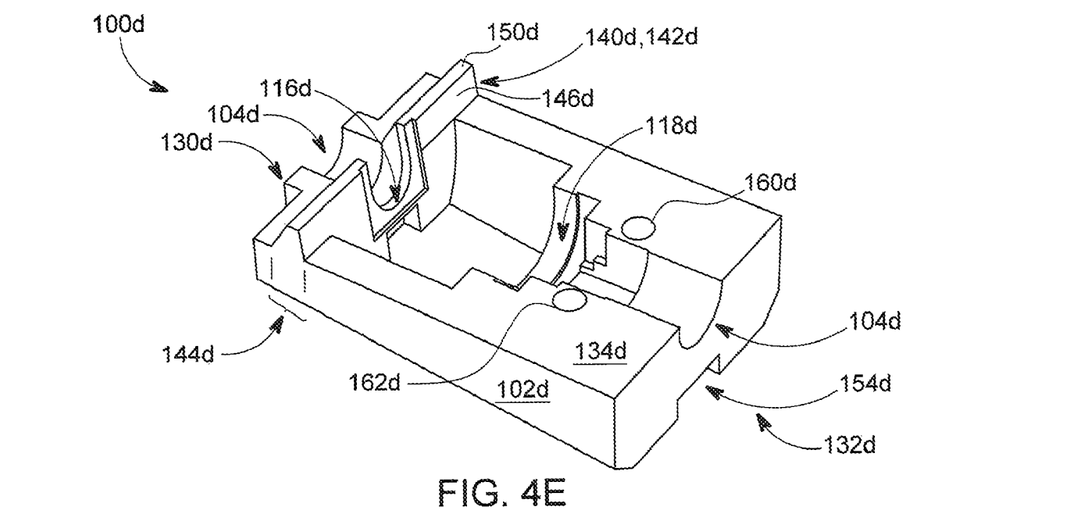
Figure 4F:
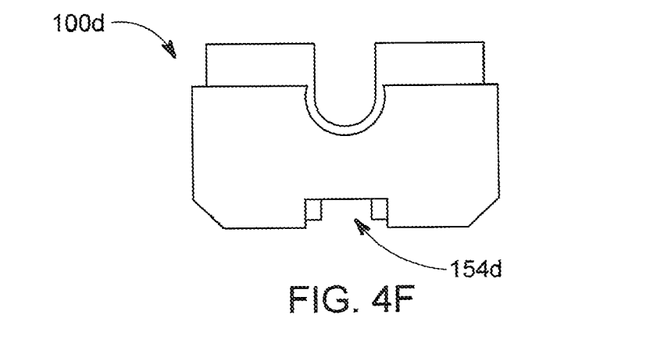

The cutout 104d also defines a number of substantially semicylindrical or partially semicylindrical ridges (also referred to as shoulders or "lands" by those of ordinary skill) 116d, 118d (see FIGS. 4B, and 4E). Please note that this embodiment of the improved holder 100d, is wedge shaped when viewed from a side (FIG. 4A) and includes a square hole 125d though the block of material 102d. (See FIG. 4C.)

The block of material 102d includes a first end portion 130d (FIG. 4C) from which a predetermined length of fiber optic cable 75 extends for enabling facing ends of two fiber optic cables to be fused together by operation of the fusion splicer machine 60 (see, e.g., FIG. 7). The block of material 102d also includes a second end portion 132d that is located opposite the first end portion 130d, and an upper surface 134d that is located between the first and second end portions 130d, 132d.

A stop or abutment 140d (FIGS. 4A, 4D, 4E) extends from the upper surface 134d of the block of material 102d and is located adjacent its first end portion 130d.

The integral stop or abutment 140d includes a wall 142d (FIGS. 4B and 4E) that is located adjacent the first end portion 130d of the block of material 102d. In addition, the wall 142d is located between two adjacent recesses 106d and 108d.

The wall 142d defines a base 144d (FIGS. 4A, 4D) oriented along longitudinal axis Xd-Xd (FIG. 4C) a first exterior surface 146d, and a second exterior surface 148d spaced from the first exterior surface 46d (FIG. 4A). The first and second aces 146d, 148d each extend from the base 144d. And each surface 146d, 148d is oriented transverse to the axis Xd-Xd. The wall 142d includes an upper portion or surface 150d (FIGS. 4A, 4D) spaced from the base 144d. The base 144d and the upper portion or surface 150d of wall 142d have respective lengths oriented along the longitudinal axis Xd-Xd, with the base length being the greater.

The improved holder 100d of the present subject matter includes a pair of spaced-apart locating cutouts 152d (see FIG. 4B) and 154d (and see FIGS. 4E, 4F) formed within an underside surface of the block of material 102d of holder 100d. Such locating cutouts 152d, 154d are dimensioned and configured for providing an interference fit with surface configurations present on a fusion splicer machine.

The illustrated block of material 102d of this embodiment of the improved holder 100d of the present subject matter includes two locator pin apertures 160d, 162d (FIGS. 4D, 4E) located on opposite sides of longitudinal axis Xd-Xd (FIG. 4C).

A fifth embodiment of the present subject matter shall now be described in connection with FIGS. 5A, 5B, 5C, 5D, 5E, 5F. This embodiment of the holder 100e, configured to retain a fiber optic cable connector 70 (FIG. 7) in a fusion splicer machine 60, comprises a block of material 102e defining a longitudinal axis Xe-Xe (FIG. 5C) and a cutout 104e oriented along the axis Xe-Xe which defines a plurality of substantially semicylindrical recesses 106e, 108e, 110e, 112e, 114e (FIGS. 5B, 5C).

Figure 5A:
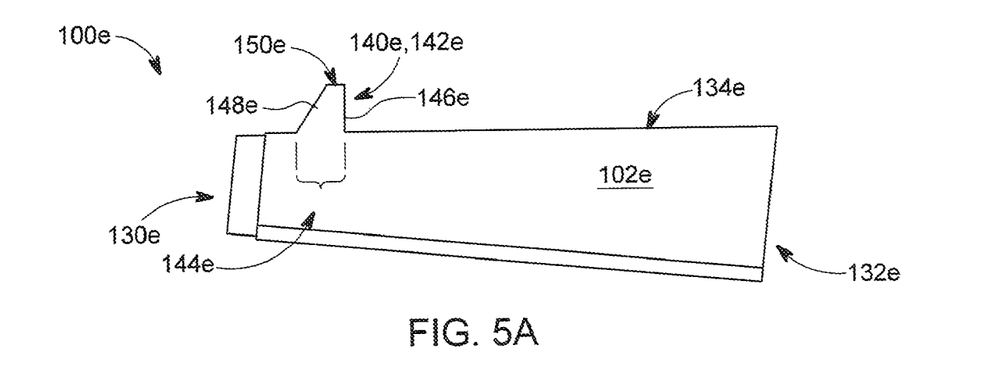
FIGS. 5A, 5B, 5C 5D, 5E, and 5F depict views of a fifth embodiment of an optic fiber cable connector holder, in accordance with the present subject matter, presenting views similar to what is described above for FIGS. 1A, 1B, 1C, 1D, 1E, 1F.
Figure 5B:
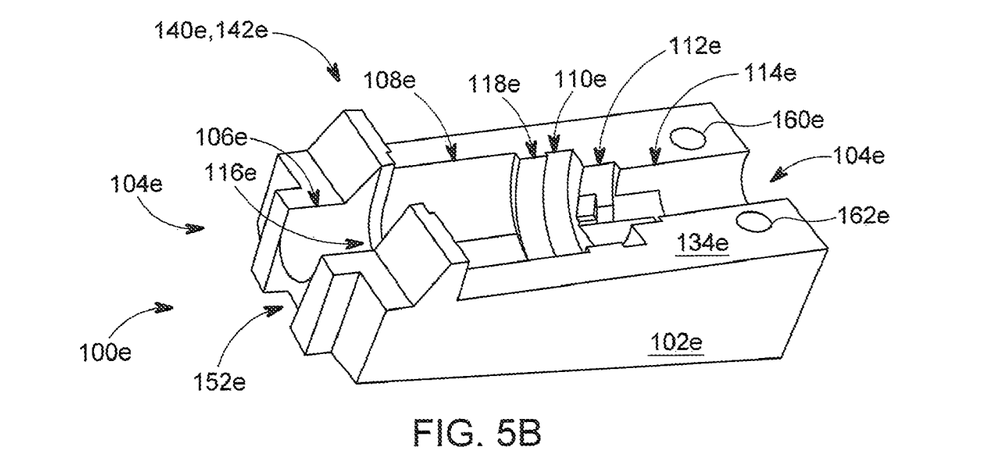
Figure 5C:
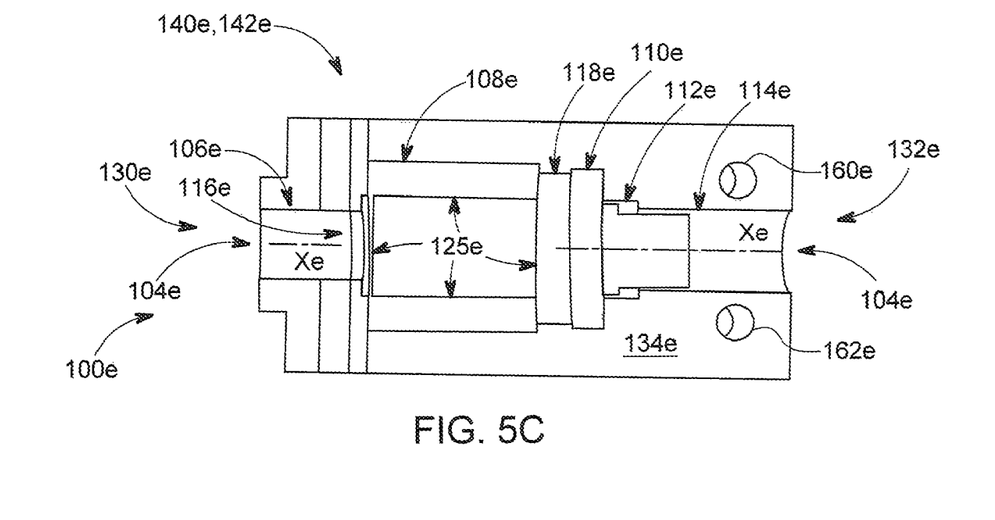

The cutout 104e also defines a number of substantially semicylindrical or partially semicylindrical ridges 116e, 118e (see FIGS. 5B, and 5C). This embodiment of the improved holder 100e, wedge shaped when viewed from a side (FIG. 5A), includes a rectangular hole 125e though the block of material 102e. (See FIG. 5C.)

The block of material 102e includes a first end portion 130e (FIG. 5C) from which a predetermined length fiber optic cable 75 extends for enabling facing ends of two fiber optic cables to be fused together by operation of the fusion splicer machine 60 (see e.g., FIG. 7). The block of material 102e also includes a second end portion 132e that is located opposite the first end portion 130e, and an upper surface 134e that is located between the first and second end portions 130e, 132e.

A stop or abutment 140e (FIGS. 5A, 5B, 5C) extends from the upper surface 134e of the block of material 102e and is located adjacent its first end portion 130e.

The integral stop or abutment 140e includes a wall 142e (FIGS. 5A, 5B, 5C) that is located adjacent the first end portion 130e of the block of material 102e. In addition the wall 142e is located between two adjacent recesses 106e and 108e.

Figure 5D:
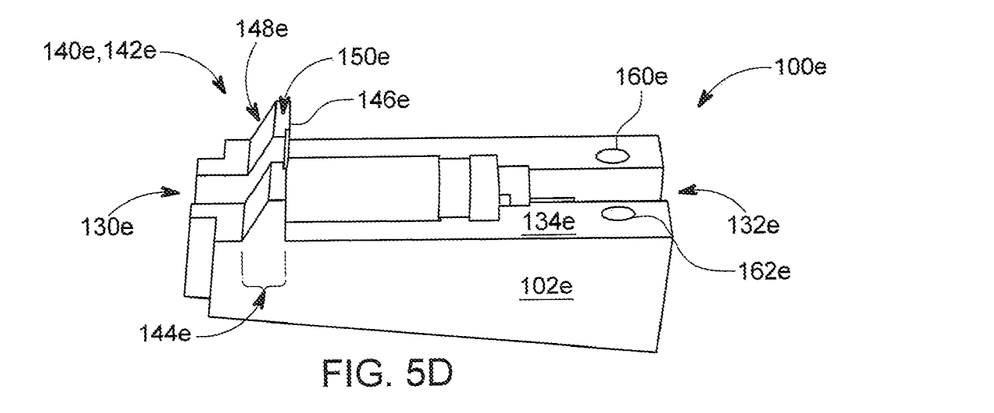
Figure 5E:
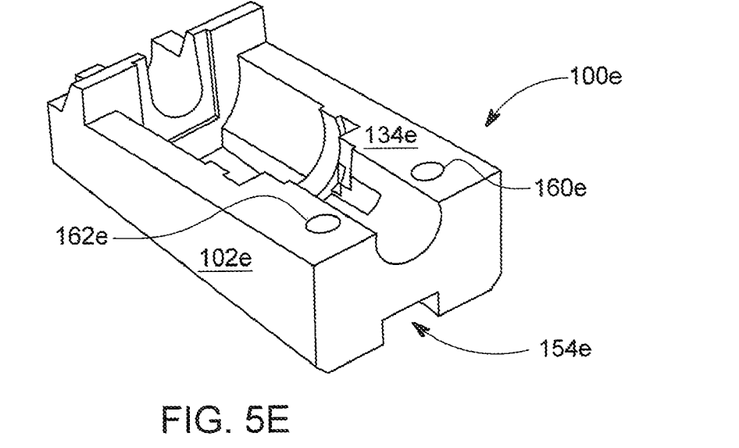
Figure 5F:
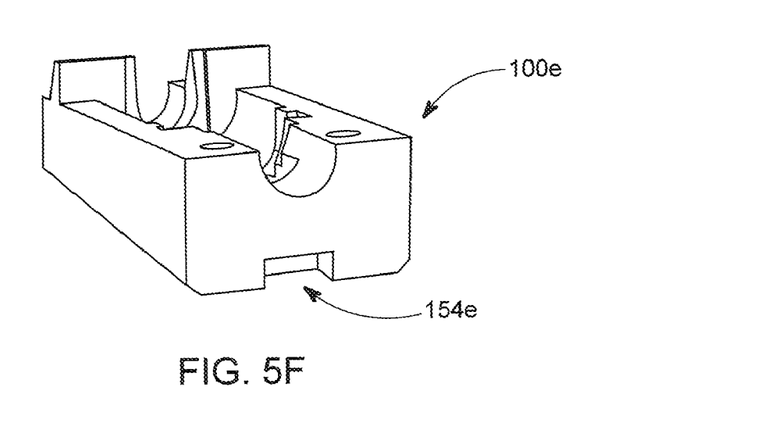

The wall 142e defines a base 144e (FIGS. 5A, 5D) oriented along longitudinal axis Xe-Xe (FIG. 5C), a first exterior surface 146e, and a second exterior surface 148e spaced from the first the exterior surface 146e (FIGS. 5A, 5D). The first and second exterior surfaces 146e, 148e each extend from the base 144e. And each surface 146e, 148e is oriented transverse to the axis Xe-Xe. The wall 142e includes an upper portion or surface 150e (FIGS. 5A, 5D) spaced from the base 144e. The base 144e and the upper portion or surface 150e of wall 142e have respective lengths oriented along the longitudinal axis Xe-Xe, with the base length being the greater.

The block of material 102e is adapted to include spaced-apart locating cutouts 152e (FIGS. 5B) and 154e (FIGS. 5E, 5F) within an underside surface of the block of material 102e. The locating cutouts 152e, 154e are configured to provide an interference fit with an associated surface portion ion splicer machine.

The illustrated block of material 102e of this embodiment of the improved holder 100e of the present subject matter includes two locator pin apertures 160e, 162e (FIGS. 5D, 5E) located on opposite sides of longitudinal axis Xe-Xe (FIG. 5C).

As noted, I originally designed my improved holder as a splice-on connector holder for 900 μm optical fiber. My improved holder enables connectors to easily splice cable when using most known fusion splicers including such brand names as, example, AFL, FiberFox, Fitel (except Ninja and S179), Fitel Ninja and S179, INNO, Fiber Instrument sales, Sumitomo, and UCL Swift (also known as ILSINTECH). To enable those people working in this field who may wish to investigate one or more of the improved cable connector holder embodiments described above, in connection with these known fusion splicers, I have prepared the following Table.

TABLE

| Improved Holder of Embodiment No. | Commercially Available Fusion Splicer Brands |
| --- | --- |
| 1 | AFL, FiberFox, INNO, Fiber Instrument sales |
| 2 | Sumitomo |
| 3 | SWIFT (ILSIN) |
| 4 | FITEL (except Ninja and S179) |
| 5 | FITEL Ninja and S179 |

What has been illustrated and described in this application is an improved holder for an optic fiber cable connector body. While the present subject matter has been described in reference to five embodiments, the present subject matter is not limited to these embodiments. On the contrary, many alternatives, changes, and/or modifications will become apparent to those of ordinary skill in the field of the present subject matter after this application has been read. Therefore, all such alternatives, changes, and modifications are to be viewed as part of the present subject matter insofar as they fall within the spirit and scope of the following claims.

I claim:

1. A holder configured for use with a fiber optic cable connector body, wherein the holder is adapted for use in a fusion splicer machine,
    wherein the holder comprises:
        a structure defining a longitudinal axis and a hollow region formed in the structure, wherein the hollow region is oriented along the axis and defines a plurality of substantially semicylindrical recesses and a plurality of semicylindrical ridges, wherein the plurality of ridges and the plurality of recesses are dimensioned and configured to receive a plurality of different connector body styles,
    wherein the improvement comprises:
        the structure further defining an integral stop,
        wherein the structure also defines a first end portion from which a predetermined length of fiber optic cable extends for enabling two fiber optic cable ends to be fused together by operation of the fusion splicer machine, wherein the structure further defines a second end portion that is located opposite the first end portion, wherein the structure also defines an upper surface extending between the first and the second end portions, and wherein the integral stop extends from the upper surface and is located adjacent the first end portion.

2. The holder of claim 1, wherein the integral stop comprises a wall adjacent the first end portion, wherein the plurality of substantially semicylindrical recesses extend between the first end portion and the second end portion of the structure, and wherein the wall is located between two adjacent recesses of the plurality of recesses.

3. The holder of claim 2, wherein the wall defines:
   a base oriented along the longitudinal axis,
   a first exterior surface and
   a second exterior surface spaced from the first exterior surface,
   wherein each of the first and second exterior surfaces extends from the base and is oriented transverse to the longitudinal axis.

4. The holder of claim 3, wherein the wall defines an upper portion spaced from the base, wherein the base and the upper portion of the wall each have respective lengths oriented along the longitudinal axis, and wherein the base length is greater.

5. The holder of claim 2, further defining at least one locating cutout formed in an underside surface of the holder, wherein the at least one locating cutout provides an interference fit with a surface configuration present on the fusion splicer machine.

6. The holder of claim 2, further defining a plurality of locating cutouts formed within a bottom side of the holder and oriented along the axis to accommodate an associated plurality of locating structures associated with the fusion splicer machine.

7. The holder of claim 6, wherein each one of the plurality of locating cutouts is configured and dimensioned to accommodate an associated one of the plurality of different styles and surface projections associated with the fusion splicer machine.

8. The holder of claim 7, wherein at least one of the plurality of locating cutouts is a square-shaped hole extending from the holder bottom side to the upper surface.

9. The holder of claim 2, further defining at least two locator pin apertures.

10. The holder of claim 9, wherein the at least two locator pin apertures are located on opposite sides of the longitudinal axis.

11. A holder configured for use with a fiber optic cable connector body, wherein the holder is adapted for use in a fusion splicer machine,
   wherein the holder comprises:
      a block of material defining a longitudinal axis and a cutout formed within the block of material, wherein the cutout is oriented along the axis and defines a plurality of substantially semicylindrical recesses and a plurality of semicylindrical ridges, wherein the plurality of ridges and the plurality of recesses are dimensioned and configured to receive a plurality of different connector body styles,
   wherein the improvement comprises:
      the block of material further defining an integral stop, wherein the block of material also defines a first end portion from which a predetermined length of fiber optic cable extends for enabling two fiber optic cable ends to be fused together by operation of the fusion splicer machine, wherein the block of material also defines a second end portion that is located opposite the first end portion, wherein the block of material also defines an upper surface between the first and second end portions, and wherein the integral stop extends from the upper surface and is located adjacent the first end portion.

12. The holder of claim 11, wherein the integral stop comprises a wall adjacent the first end portion, wherein the plurality of substantially semicylindrical recesses extend from the first end portion to the second end portion of the block of material, wherein the wall is located between two adjacent recesses of the plurality of recesses.

13. The holder of claim 12, wherein the wall defines:
   a base oriented along the longitudinal axis,
   a first exterior surface and
   a second exterior surface spaced from the first exterior surface,
   wherein each of the first and second exterior surfaces extends from the base and is oriented transverse to the longitudinal axis.

14. The holder of claim 13, wherein the wall defines an upper portion spaced from the base, wherein the base and the upper portion of the wall have respective lengths oriented along the longitudinal axis, and wherein the base length is greater.

15. The holder of claim 12, further defining at least one locating cutout formed in an underside surface of the holder, wherein the at least one locating cutout provides an interference fit with a surface configuration present on the fusion splicer machine.

16. The holder of claim 12, further defining a plurality of locating cutouts formed in a bottom side of the holder and oriented along the axis to accommodate an associated plurality of locating structures associated with the fusion splicer machine.

17. The holder of claim 16, wherein each one of the plurality of locating cutouts is configured and dimensioned to accommodate an associated one of the plurality of different styles and surface projections associated with the fusion splicer machine.

18. The holder of claim 17, wherein at least one of the plurality of locating cutouts is a square-shaped hole extending from the bottom side to the upper surface.

19. The holder of claim 12, further defining at least two locator pin apertures.

20. The holder of claim 19, wherein the at least two locator pin apertures are located on opposite sides of the longitudinal axis.

* * * * *